(12) United States Patent
Okumura

(10) Patent No.: US 11,573,052 B2
(45) Date of Patent: Feb. 7, 2023

(54) METHOD FOR MANUFACTURING HONEYCOMB STRUCTURE

(71) Applicant: NGK INSULATORS, LTD., Nagoya (JP)

(72) Inventor: Kensuke Okumura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 406 days.

(21) Appl. No.: 15/921,913

(22) Filed: Mar. 15, 2018

(65) Prior Publication Data

US 2018/0283785 A1 Oct. 4, 2018

(30) Foreign Application Priority Data

Mar. 28, 2017 (JP) .............................. JP2017-063617

(51) Int. Cl.
| | |
|---|---|
| *F26B 3/347* | (2006.01) |
| *F01N 3/022* | (2006.01) |
| *B28B 11/24* | (2006.01) |
| *C04B 35/626* | (2006.01) |
| *C04B 38/00* | (2006.01) |
| *C04B 41/53* | (2006.01) |
| *C04B 38/06* | (2006.01) |
| *C04B 35/195* | (2006.01) |
| *C04B 41/50* | (2006.01) |
| *C04B 111/00* | (2006.01) |

(52) U.S. Cl.
CPC .......... *F26B 3/347* (2013.01); *B28B 11/241* (2013.01); *B28B 11/243* (2013.01); *C04B 35/195* (2013.01); *C04B 35/62655* (2013.01); *C04B 38/0009* (2013.01); *C04B 38/0615* (2013.01); *C04B 41/5307* (2013.01); *C04B 41/5384* (2013.01); *F01N 3/0222* (2013.01); *C04B 41/5089* (2013.01); *C04B 2111/0081* (2013.01); *C04B 2111/00793* (2013.01); *C04B 2235/60* (2013.01); *C04B 2235/606* (2013.01); *C04B 2235/6021* (2013.01); *C04B 2235/94* (2013.01); *F01N 2330/06* (2013.01); *F26B 2210/02* (2013.01)

(58) Field of Classification Search
CPC .... F26B 3/347; F26B 2210/02; B28B 11/241; B28B 11/243; C04B 38/0615; C04B 38/0009; C04B 41/5384; C04B 41/5307; C04B 35/62655; C04B 2111/0081; C04B 2111/00793; F01N 3/0222; F01N 2330/06
See application file for complete search history.

(56) References Cited

U.S. PATENT DOCUMENTS

| | | | |
|---|---|---|---|
| 9,126,869 B1 * | 9/2015 | Yamayose | ........... C04B 38/0006 |
| 10,174,996 B2 | 1/2019 | Okumura et al. | |
| 2004/0065068 A1 * | 4/2004 | Otsubo | .............. B01D 46/2451 |
| | | | 55/523 |
| 2006/0192324 A1 | 8/2006 | Kaneda et al. | |
| 2009/0235552 A1 | 9/2009 | Takagi et al. | |
| 2011/0304073 A1 | 12/2011 | Tokunaga | |
| 2013/0207322 A1 * | 8/2013 | Kaneda | ..................... B01J 35/04 |
| | | | 264/630 |
| 2016/0288365 A1 | 10/2016 | Asakura et al. | |
| 2018/0283783 A1 * | 10/2018 | Okumura | ................. F26B 3/347 |
| 2018/0283784 A1 * | 10/2018 | Okumura | .............. B28B 11/247 |

FOREIGN PATENT DOCUMENTS

| | | |
|---|---|---|
| CN | 102470548 A | 5/2012 |
| JP | 2009-226633 A | 10/2009 |
| JP | 2010-228219 A | 10/2010 |
| JP | 4627498 B2 | 2/2011 |
| JP | 2011-195344 A | 10/2011 |
| JP | 2013-180413 A | 9/2013 |
| JP | 2016-190397 A1 | 11/2016 |
| WO | 2015/159823 A1 | 10/2015 |

OTHER PUBLICATIONS

Japanese Office Action (with English Abstract), Japanese Application No. 2017-063617, dated Jun. 25, 2019 (6 pages).
Japanese Office Action (with English translation), Japanese Application No. 2017-063617, dated Dec. 10, 2019 (7 pages).

* cited by examiner

*Primary Examiner* — Abbas Rashid
*Assistant Examiner* — Elisa H Vera
(74) *Attorney, Agent, or Firm* — Burr & Brown, PLLC

(57) ABSTRACT

A method for manufacturing a honeycomb structure, includes: a step of manufacturing a honeycomb formed body to manufacture a non-fired honeycomb formed body having volume of 7 L or more; a drying step of drying the manufactured non-fired honeycomb formed body to obtain a honeycomb dried body; and a firing step of firing the obtained honeycomb dried body to obtain a honeycomb structure. The drying step includes: an induction drying step to obtain a first dried honeycomb formed body by removing 20 to 80% of the entire water that the non-fired honeycomb formed body contained before drying, and a microwave drying step to obtain a honeycomb dried body by removing the residual water. The honeycomb dried body subjected to this microwave drying step is obtained by removing 90% or more of the entire water that the non-fired honeycomb formed body contained before drying.

4 Claims, 1 Drawing Sheet

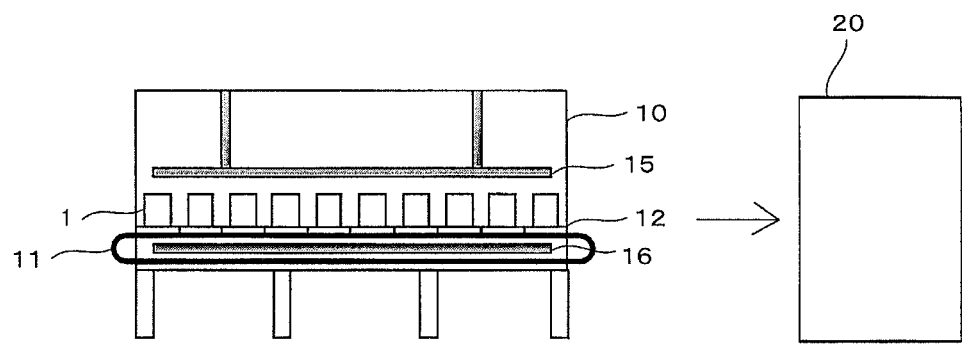

METHOD FOR MANUFACTURING HONEYCOMB STRUCTURE

The present application is an application based on JP-2017-063617 filed on Mar. 28, 2017 with Japan Patent Office, the entire contents of which are incorporated herein by reference.

BACKGROUND OF THE INVENTION

Field of the Invention

The present invention relates to a method for manufacturing a honeycomb structure. More particularly the present invention relates to a method for manufacturing a honeycomb structure capable of generating less cracks and deformation of the cells during drying of a honeycomb formed body with large volume and of producing a honeycomb structure effectively.

Description of the Related Art

Conventionally honeycomb structures made of ceramics have been widely used as a catalyst carrier or a various types of filters. Such a honeycomb structure made of ceramics has been used for a diesel particulate filter (DPF) as well to capture particulate matters (PMs) emitted from a diesel engine.

To produce such a honeycomb structure, a kneaded material is typically extruded to make a honeycomb-shaped formed body (honeycomb formed body), and this honeycomb formed body is dried and then fired. The kneaded material is produced by adding water and various additives, such as binder, to a ceramic material to prepare a raw material and kneading the raw material.

Recently developed honeycomb structures have larger porosity by drying a honeycomb formed body obtained by mixing pore former such as water absorbable resin with the ceramic raw material and firing the honeycomb formed body (see Patent Document 1).

More specifically the following methods are known to dry the honeycomb formed body. That is, the known drying methods include natural drying to simply allow a honeycomb formed body to stand at room temperatures, hot-air drying to introduce hot air generated by a gas burner for drying, induction drying, and microwave drying using microwaves (see Patent Document 2, for example). The induction drying method is to apply electric current between electrodes disposed above and below the honeycomb formed body so as to generate high-frequency energy there and dry the honeycomb formed body by the high-frequency energy.
[Patent Document 1] JP-B-4627498
[Patent Document 2] JP-A-2016-190397

SUMMARY OF THE INVENTION

When a honeycomb formed body has large volume, the amount of contraction during drying is large. Therefore cracks and deformation of the cells may occur in the honeycomb formed body during conventional drying, such as microwave drying. This leads to a problem of low productivity of honeycomb structures.

In view of such problems of the conventional techniques, the present invention provides a method for manufacturing a honeycomb structure capable of generating less cracks and deformation of the cells during drying of a honeycomb formed body with large volume and of producing a honeycomb structure effectively.

According to a first aspect of the present invention, a method for manufacturing a honeycomb structure is provided, including: a step of manufacturing a honeycomb formed body to manufacture a non-fired honeycomb formed body having volume of 7 L or more and including a cell wall that defines a plurality of cells extending from a first end face as one end face to a second end face as the other end face, the non-fired honeycomb formed body including a raw material composition containing a ceramic raw material and water; a drying step of drying the manufactured non-fired honeycomb formed body to obtain a honeycomb dried body; and a firing step of firing the obtained honeycomb dried body to obtain a honeycomb structure, wherein the drying step includes: an induction drying step of induction-drying the non-fired honeycomb formed body so as to obtain a first dried honeycomb formed body by removing 20 to 80% of the entire water that the non-fired honeycomb formed body contained before drying, and a microwave drying step of microwave-drying the first dried honeycomb formed body subjected to the induction drying step so as to obtain a honeycomb dried body by removing the residual water, wherein the honeycomb dried body subjected to the microwave drying step is obtained by removing 90% or more of the entire water that the non-fired honeycomb formed body contained before drying.

According to a second aspect of the present invention, the method for manufacturing a honeycomb structure according to the first aspect is provided, wherein the non-fired honeycomb formed body to be supplied to the induction drying step in the drying step has water content before drying of 20 to 60%.

According to a third aspect of the present invention, the method for manufacturing a honeycomb structure according to the first or second aspects is provided, wherein the raw material composition includes water absorbable resin as pore former.

According to a fourth aspect of the present invention, the method for manufacturing a honeycomb structure according to any one of the first to third aspects is provided, wherein the non-fired honeycomb formed body to be supplied to the induction drying step in the drying step has a round pillar shape, the non-fired honeycomb formed body has a diameter at an end face of 220 to 400 mm, and has a length in the cell-extending direction of 200 to 400 mm, and the non-fired honeycomb formed body has a thickness of the cell wall of 30 to 350 μm.

The method for manufacturing a honeycomb structure of the present invention generates less cracks and deformation of the cells during drying of a honeycomb formed body with large volume and can produce a honeycomb structure effectively.

BRIEF DESCRIPTION OF THE DRAWING

FIG. 1 schematically describes a drying step in one embodiment of a method for manufacturing a honeycomb structure of the present invention.

DESCRIPTION OF THE PREFERRED EMBODIMENTS

The following specifically describes embodiments of the present invention, with reference to the drawing. The present invention is not limited to the following embodiments. The present invention is to be understood to include the following embodiments, to which modifications and improvements are added as needed based on the ordinary knowledge of a person skilled in the art without departing from the scope of the present invention.

(1) Method for Manufacturing a Honeycomb Structure:

One embodiment of a method for manufacturing the honeycomb structure of the present invention includes a step of manufacturing a honeycomb formed body, a drying step, and a firing step. A honeycomb structure can be manufactured through these steps. More specifically, the step of manufacturing a honeycomb formed body is to manufacture "a non-fired honeycomb formed body having volume of 7 L or more and including a cell wall that defines a plurality of cells extending from a first end face as one end face to a second end face as the other end face". This non-fired honeycomb formed body includes a raw material composition containing a ceramic raw material and water. The drying step is to dry the manufactured non-fired honeycomb formed body so as to obtain a honeycomb dried body. This drying step includes an induction drying step and a microwave drying step. This induction drying step is to induction-dry a non-fired honeycomb formed body so as to obtain "a first dried honeycomb formed body by removing 20 to 80% of the entire water that this non-fired honeycomb formed body contained before drying". The microwave drying step is to microwave-dry the first dried honeycomb formed body subjected to the induction drying step so as to obtain a honeycomb dried body by removing the residual water. The honeycomb dried body subjected to this microwave drying step is obtained by removing 90% or more of the entire water that this non-fired honeycomb formed body contained before drying. The firing step is to fire the obtained honeycomb dried body to obtain a honeycomb structure.

The method for manufacturing a honeycomb structure of the present invention generates less cracks and deformation of the cells during drying of a honeycomb formed body with large volume and can produce a honeycomb structure effectively. This method can prevent a center part of the non-fired honeycomb formed body from reaching a high temperature during induction drying and so can produce a honeycomb structure effectively. More specifically, the induction drying is preferably performed while keeping the temperature of a center part of the non-fired honeycomb formed body at 150° C. or lower.

FIG. 1 schematically shows the drying step in the method for manufacturing a honeycomb structure of the present invention. As shown in FIG. 1, a non-fired honeycomb formed body 1 is placed on a perforated plate 12 disposed on a conveyor 11 of an induction drying device 10, and voltage is applied to electrode plates 15, 16 located above and below the non-fired honeycomb formed body 1. In this way, the non-fired honeycomb formed body 1 is induction-dried under the predetermined condition as stated above, and then is microwave-dried by a microwave drying device 20.

(1-1) Step of Manufacturing a Honeycomb Formed Body:

In the step of manufacturing a honeycomb formed body, "a non-fired honeycomb formed body including a cell wall that defines a plurality of cells extending from a first end face as one end face to a second end face as the other end face" is manufactured by forming a raw material composition containing a ceramic raw material and water as stated above. Herein the non-fired honeycomb formed body refers to a honeycomb formed body in the state where particles of the ceramic raw material are present while keeping the particulate shape when the raw material composition is formed into a honeycomb shape and the ceramic raw material is not sintered.

The ceramic raw material contained in the raw material composition preferably includes at least one type of materials selected from the group consisting of cordierite forming raw material, cordierite, silicon carbide, silicon-silicon carbide composite material, mullite, and aluminum titanate. The cordierite forming raw material is a ceramic raw material formulated to have a chemical composition in the range of 42 to 56 mass % of silica, 30 to 45 mass % of alumina and 12 to 16 mass % of magnesia. The cordierite forming raw material forms cordierite after firing.

The raw material composition may be prepared by mixing the ceramic raw material and water as stated above with dispersing medium, organic binder, inorganic binder, pore former, surfactant and the like. The composition ratio of these raw materials is not limited especially, and any composition ratio suitable for the structure of the honeycomb structure to be manufactured, its materials and the like is preferable.

The present invention can lower the generation rate of cracks and deformation of the cells during drying also for a honeycomb formed body containing water absorbable resin as the pore former in the raw material composition. Some of the recently developed honeycomb structures include pore former made of water absorbable resin in the raw material composition to increase the porosity. Although the porosity of a honeycomb structure including the pore former made of water absorbable resin can increase easily, the honeycomb formed body contains water a lot and so such a honeycomb formed body tends to have non-uniform distribution of the water during drying. Therefore it is difficult to dry the interior of the honeycomb formed body uniformly.

The "water absorbable resin" refers to resin having a property of swelling to a few to dozens of times its volume when the resin absorbs water. The example of such resin includes sodium polyacrylate.

About 0.5 to 10.0 mass % of such water absorbable resin may be included in the raw material composition. The present invention can lower the generation rate of cracks and deformation of the cells during drying also for a honeycomb formed body containing water absorbable resin in such a ratio.

When the raw material composition is formed, the raw material composition is firstly kneaded to be a kneaded material, and the obtained kneaded material is formed to have a honeycomb shape having a plurality of through holes so as to make a honeycomb formed body. A method for preparing the kneaded material by kneading the raw material composition may be a method using a kneader or a vacuum pugmill, for example. A method for forming the kneaded material to make a honeycomb formed body may be a known forming method, such as extrusion and injection molding. More specifically, a honeycomb formed body is preferably made by extrusion using a die having a desired cell shape, partition wall (cell wall) thickness and cell density. A preferable material of the die is cemented carbide having wear resistance.

The shape of cells of the non-fired honeycomb formed body (the shape of cells in a cross section orthogonal to the extending direction of the cells) is not limited especially. Examples of the shape of cells include a triangle, a quadrangle, a hexagon, an octagon, a circle and the combination of them.

The outer shape of the honeycomb formed body is not limited especially, and the examples of the shape include a round pillar shape, an elliptic pillar shape, and a polygonal prismatic columnar shape having an end face of a shape, such as "square, rectangle, triangle, pentagon, hexagon, and octagon".

The present invention provides an excellent method for manufacturing a large-volume honeycomb structure having volume of 7 L (liters) or more (hereinafter this may be referred to as "large-volume body"), and particularly can lower the generation rate of cracks and cell deformation during drying of a non-fired honeycomb formed body. More specifically the volume of the non-fired honeycomb formed body may be 8 to 50 L.

The outer shape of the non-fired honeycomb formed body may be a round pillar shape. In this case, the non-fired honeycomb formed body may have a diameter at end face of 220 to 400 mm, preferably 250 to 400 mm, and more preferably 280 to 400 mm.

When the non-fired honeycomb formed body has a round pillar outer shape, the non-fired honeycomb formed body may have a length in the cell-extending direction of 200 to 400 mm, preferably 220 to 400 mm, and more preferably 250 to 400 mm.

When the non-fired honeycomb formed body has a round pillar outer shape, the non-fired honeycomb formed body may have a thickness of the cell wall of 30 to 350 μm, preferably 30 to 300 μm, and more preferably 30 to 200 μm.

The present invention can lower the generation rate of cracks and deformation of the cells during drying for a non-fired honeycomb formed body under such a condition (diameter of the end face, the length in the cell-extending direction, and the thickness of cell wall).

The content of water in a non-fired honeycomb formed body may vary with the characteristics required for the product. For instance, a non-fired honeycomb formed body in the present invention preferably has water content in the range of 20 to 60%. That is, the non-fired honeycomb formed body to be supplied to the induction drying step preferably has the water content of 20 to 60%. The water content of the "non-fired honeycomb formed body" is a value measured about the raw material composition with an infrared heating moisture meter.

(1-2) Drying Step:

The drying step is to dry the manufactured non-fired honeycomb formed body so as to obtain a honeycomb dried body, and includes the induction drying step and the microwave drying step. The drying step in the manufacturing method of the present invention can lower the generation rate of cracks and cell deformation of a non-fired honeycomb formed body. As a result, the present invention can produce honeycomb structures effectively.

(1-2-1) Induction Drying Step:

In this step, "a first dried honeycomb formed body" is obtained by removing "20 to 80% of the entire water that the non-fired honeycomb formed body contained before drying". That is, this step ends when 20 to 80% of the entire water that the non-fired honeycomb formed body contained before drying is removed, and then the procedure shifts to the microwave drying step. The induction drying is to dry a product from the center part, and the microwave drying is to dry a product from the outer surface. When a non-fired honeycomb formed body is dried by only one of the induction drying and the microwave drying, a heated part will be concentrated at the center part or the outer surface of the honeycomb formed body, which means a large difference in temperature between the center part and the outer surface. As a result, cracks or cell deformation occurs in the honeycomb formed body. Then, both of the drying methods of the induction drying and the microwave drying may be combined, whereby a difference in temperature between the center part and the outer surface of the honeycomb formed body can be reduced. When microwave drying of these drying methods is performed first, the outer surface of the honeycomb formed body is heated first, so that contraction due to drying occurs from the outer skin (outer surface). As a result, pressure is applied to the interior of the product (honeycomb formed body) and so deformation occurs in the cells. Also when drying is performed in the order of induction drying and microwave drying, it is important to select an appropriate condition to end the induction drying.

The water content of the first dried honeycomb formed body is calculated based on a difference between the water content of the non-fired honeycomb formed body before drying and the water removal ratio in the induction drying step (removal ratio after induction). To this end, induction drying may be performed beforehand under a plurality of drying conditions so as to find a condition achieving the water content of the first dried honeycomb formed body in the range as stated above.

The first dried honeycomb formed body has to be obtained by removing 20 to 80% of the entire water that the non-fired honeycomb formed body contained before drying as stated above. Preferably the first dried honeycomb formed body is obtained by removing 30 to 70% of the entire water that the non-fired honeycomb formed body contained before drying. More preferably the first dried honeycomb formed body is obtained by removing 40 to 60% of the entire water that the non-fired honeycomb formed body contained before drying. If induction drying step ends when less than 20% of the entire water that the non-fired honeycomb formed body contained before drying is removed, cracks and cell deformation occur in the honeycomb dried body, and so a honeycomb structure cannot be produced efficiently. If induction drying step ends when 80% and above the entire water that the non-fired honeycomb formed body contained before drying is removed, cracks and cell deformation occur in the honeycomb dried body, and so a honeycomb structure cannot be produced efficiently. To remove 80% and above of the entire water, the gap between electrodes has to be widened for drying a large-volume body, and so voltage tends to increase. That is, the honeycomb formed body contains less water at the latter half of the drying process, and the electrical resistance increases. This leads to a significant increase in voltage. As a result, malfunction of the device may occur frequently due to the discharging.

In this step, the induction drying is preferably performed while keeping the temperature (highest temperature) of a center part of the non-fired honeycomb formed body at 150° C. or lower. This can prevent deformation of the non-fired formed body. More specifically, if the temperature of the non-fired honeycomb formed body exceeds 150° C., organic auxiliary agent, which is mixed to improve the shape-retainability of the non-fired honeycomb formed body, reaches its combustion temperature range, and so the strength of the honeycomb formed body after drying is not enough and the first dried honeycomb formed body may collapse.

The temperature of a center part of the non-fired honeycomb formed body may be measured by embedding a compact temperature-measuring device in a product (non-fired honeycomb formed body before drying) in a preliminary test. Preferably an output and a drying time of a drying device that can keep the temperature of a center part of the non-fired honeycomb formed body at 150° C. or less is found beforehand.

For the induction drying of a non-fired honeycomb formed body in this step, a frequency of 10 to 50 MHz is typically used.

(1-2-2) Microwave Drying Step:

For the microwave drying of a honeycomb formed body in this step, a frequency of 1000 to 10000 MHz is typically used.

Such microwave drying following the induction drying step as in the present invention can avoid the risk of malfunction of the device, resulting from excessive temperature rise during induction drying and discharging.

Considering the risk of ignition of binder or the like in the honeycomb formed body, the output of microwaves during the microwave drying in this step is preferably set so that the temperature of the honeycomb dried body does not exceed 150° C. The drying time in this step may be set so that the remaining water can be reduced so as not to affect the subsequent firing step. More specifically "so as not to affect the subsequent firing step" refers to the state of removing 90% or more of the entire water content of the non-fired honeycomb formed body.

That is, the honeycomb dried body obtained from the microwave drying step of the present invention is obtained by removing 90% or more of the entire water that the non-fired honeycomb formed body contained before drying. This can prevent cell deformation or cracks in the honeycomb structure obtained after the firing step. If the removal ratio of water of the honeycomb dried body is less than 90%, cell deformation or cracks occur in the obtained honeycomb structure.

(1-3) Firing Step:

In the firing step, the honeycomb dried body subjected to the drying step is fired to obtain a honeycomb structure.

The honeycomb dried body may be fired in a firing oven, for example. For the firing oven and the firing condition, a conventionally known condition may be selected as needed to be suitable for the outer shape, the material and the like of the honeycomb structure. The honeycomb dried body may be calcinated before the firing to burn and remove organic substances, such as binder.

EXAMPLES

The following describes the present invention more specifically by way of examples. The present invention is not limited to the following examples.

Example 1

Binder including organic binder, pore former, and water (36 mass %) as the dispersing medium were firstly mixed with the cordierite forming raw material including the mixture of alumina, kaolin and talc as the ceramic raw material. This was kneaded to obtain a kneaded material. For the pore former, water absorbable resin was used.

The obtained kneaded material was extruded so as to obtain a non-fired honeycomb formed body having cells of a square in cross section orthogonal to the cell-extending direction. This non-fired honeycomb formed body had a diameter of 380 mm, a length (length in the cell-extending direction) of 280 mm, and this honeycomb formed body had externally a round pillar shape. This non-fired honeycomb formed body had volume of 31.8 L.

The obtained non-fired honeycomb formed body had the water content of 35.7% (in Table 1, described as "initial water content"), the cell density of 46 pieces/cm$^2$, the thickness of cell wall of 200 μm, and the mass of 12700 g. This non-fired honeycomb formed body was dried as follows.

The obtained non-fired honeycomb formed body was induction-dried as a batch using an induction drying device with the frequency of 40.0 MHz, the output of 50.0 kW and the heating time of 120 seconds (induction drying step). In this way, a first dried honeycomb formed body (having mass of 11690 g) was obtained by removing 22.3% of the entire water that the non-fired honeycomb formed body contained before drying (i.e., the drying ratio was 22.3%). Under the above-stated drying condition, the temperature of the center part of the non-fired honeycomb formed body was 98° C. (150° C. or lower). This temperature of the non-fired honeycomb formed body at the center part was measured with an optical fiber thermometer by inserting the optical fiber thermometer into the cells to the center position of the non-fired honeycomb formed body. In Table 2, "removal ratio after induction (%)" indicates the ratio (%) of the amount of water removed by the induction drying step out of the mass before drying of the non-fired honeycomb formed body. "Drying ratio (%)" indicates the ratio (%) of the amount of water removed by the induction drying step out of the entire amount of water that the honeycomb formed body contained before drying. The entire amount of water that the honeycomb formed body contained before drying can be calculated in accordance with the following expression. Expression: the entire amount of water that the honeycomb formed body contained before drying (g)=Mass before drying (g)×Initial water content (%)/100.

Next, the first dried honeycomb formed body was microwave-dried with a microwave drying device as a batch with the frequency of 915 MHz, the output of 63 kW and the heating time of 220 seconds (microwave drying step) to remove the residual water.

Next, the water content of the first dried honeycomb formed body (honeycomb dried body) after the microwave drying was measured so as to confirm that the honeycomb dried body was dried. The result showed that the water content of the honeycomb dried body was 2.9%. The honeycomb dried body subjected to this microwave drying step was obtained by removing 91.9% (90% or more) of the entire water that this non-fired honeycomb formed body contained before drying. This is shown in the field of "Water removal ratio after microwave drying (%)" in Table 2.

The obtained honeycomb dried body was evaluated by the following method. The evaluation result is shown in the field of "Evaluation of drying step" in Table 3.

The obtained honeycomb dried body was cut at positions away from the first end face and the second end face of the honeycomb dried body in the cell-extending direction by 30 mm, and these end faces were checked visually. Then the honeycomb dried body was evaluated based on the following criteria. When the temperature at the center part of the honeycomb dried body did not excessively rise at 150° C. or higher during the induction drying step, and no cell deformation and cracks were found, the honeycomb dried body was evaluated as "OK". When although no cell deformation or cracks were found, the temperature at the center part of the honeycomb dried body excessively rose at 150° C. or higher during the induction drying step, or when cell deformation or cracks were found, the honeycomb dried body was evaluated as "NG".

Then the obtained honeycomb dried body was fired to obtain a honeycomb structure. Firing was performed at 1400° C. for 5 hours.

The obtained honeycomb structure was evaluated by the following method. The evaluation result is shown in the field of "Evaluation after firing" in Table 3. The evaluation criteria are as follows. When no cell deformation or cracks were found visually, the honeycomb structure was evaluated as "OK", and when cell deformation or cracks were found, the honeycomb structure was evaluated as "NG".

The honeycomb structure was evaluated comprehensively based on these evaluation results. The evaluation criteria are as follows. When the evaluation at the drying step was "OK" and the evaluation after firing was "OK", it was evaluated as "OK". When any one of the evaluation at the drying step and the evaluation after firing was "NG", it was evaluated as "NG".

TABLE 1

| | | Non-fired honeycomb formed body | | | | | | | |
|---|---|---|---|---|---|---|---|---|---|
| | Outer shape | Diameter (mm) | Length (mm) | Volume (L) | Cell wall thickness (μm) | Cell density (pieces/cm$^2$) | Mass before drying (g) | Initial water content (%) | Additive amount of pore former (%) |
| Comp. Ex. 1 | round-pillar shape | 380 | 280 | 31.8 | 200 | 46 | 10260 | 48.5 | 6.0 |
| Comp. Ex. 2 | round-pillar shape | 380 | 280 | 31.8 | 200 | 46 | 10400 | 48.5 | 6.0 |
| Comp. Ex. 3 | round-pillar shape | 380 | 280 | 31.8 | 200 | 46 | 10300 | 48.5 | 6.0 |
| Comp. Ex. 4 | round-pillar shape | 380 | 265 | 30.9 | 100 | 62 | 10360 | 48.5 | 6.0 |
| Comp. Ex. 5 | round-pillar shape | 377 | 290 | 32.4 | 200 | 46 | 12300 | 35.7 | 3.0 |
| Ex. 1 | round-pillar shape | 380 | 280 | 31.8 | 200 | 46 | 12700 | 35.7 | 3.0 |
| Ex. 2 | round-pillar shape | 380 | 280 | 31.8 | 200 | 46 | 12590 | 35.7 | 3.0 |
| Ex. 3 | round-pillar shape | 385 | 265 | 30.9 | 100 | 62 | 12800 | 35.7 | 3.0 |
| Ex. 4 | round-pillar shape | 385 | 265 | 30.9 | 100 | 62 | 10950 | 35.7 | 3.0 |
| Ex. 5 | round-pillar shape | 377 | 290 | 32.4 | 200 | 46 | 10990 | 35.7 | 3.0 |
| Ex. 6 | round-pillar shape | 377 | 290 | 32.4 | 200 | 46 | 10980 | 35.7 | 3.0 |
| Ex. 7 | round-pillar shape | 377 | 290 | 32.4 | 200 | 46 | 10325 | 48.5 | 6.0 |
| Ex. 8 | round-pillar shape | 377 | 290 | 32.4 | 200 | 46 | 10270 | 48.5 | 6.0 |
| Ex. 9 | round-pillar shape | 380 | 280 | 31.8 | 200 | 46 | 10340 | 35.7 | 3.0 |
| Ex. 10 | round-pillar shape | 250 | 230 | 11.3 | 76 | 93 | 5286 | 36.2 | 3.5 |
| Comp. Ex. 6 | round-pillar shape | 377 | 290 | 32.4 | 200 | 46 | 10260 | 48.5 | 6.0 |
| Comp. Ex. 7 | round-pillar shape | 380 | 280 | 31.8 | 200 | 46 | 10365 | 48.5 | 6.0 |
| Comp. Ex. 8 | round-pillar shape | 250 | 230 | 11.3 | 76 | 93 | 5277 | 36.2 | 3.5 |

TABLE 2

| | Induction drying step | | | | First dried honeycomb formed body | | Removal | |
|---|---|---|---|---|---|---|---|---|
| | Frequency (MHz) | Output (kW) | Time (sec.) | Temperature at center part (° C.) | Mass after induction (g) | Water content (%) | ratio after induction (%) | Drying ratio (%) |
| Comp. Ex. 1 | — | — | — | — | 10260 | 48.5 | 0.0 | 0.0 |
| Comp. Ex. 2 | — | — | — | — | 10400 | 48.5 | 0.0 | 0.0 |
| Comp. Ex. 3 | 40.0 | 50.0 | 80 | 87 | 9395 | 39.7 | 8.8 | 18.1 |
| Comp. Ex. 4 | 40.0 | 50.0 | 90 | 92 | 9380 | 39.0 | 9.5 | 19.5 |
| Comp. Ex. 5 | 40.0 | 50.0 | 130 | 104 | 11080 | 25.8 | 9.9 | 27.8 |
| Ex. 1 | 40.0 | 50.0 | 120 | 98 | 11690 | 27.7 | 8.0 | 22.3 |
| Ex. 2 | 40.0 | 50.0 | 130 | 103 | 11570 | 27.6 | 8.1 | 22.7 |
| Ex. 3 | 40.0 | 50.0 | 130 | 105 | 11510 | 25.6 | 10.1 | 28.2 |
| Ex. 4 | 40.0 | 50.0 | 140 | 117 | 9550 | 22.9 | 12.8 | 35.8 |
| Ex. 5 | 40.0 | 50.0 | 160 | 123 | 9400 | 21.2 | 14.5 | 40.5 |
| Ex. 6 | 40.0 | 50.0 | 160 | 118 | 9260 | 20.0 | 15.7 | 43.9 |
| Ex. 7 | 40.0 | 50.0 | 230 | 135 | 6950 | 15.8 | 32.7 | 67.4 |
| Ex. 8 | 40.0 | 50.0 | 240 | 132 | 6790 | 14.6 | 33.9 | 69.9 |
| Ex. 9 | 40.0 | 50.0 | 200 | 145 | 7540 | 8.6 | 27.1 | 75.9 |
| Ex. 10 | 40.0 | 50.0 | 100 | 129 | 3953.9 | 11.0 | 25.2 | 69.6 |
| Comp. Ex. 6 | 40.0 | 50.0 | 330 | 158 | 5290 | 0.1 | 48.4 | 99.9 |
| Comp. Ex. 7 | 40.0 | 50.0 | 330 | 162 | 5315 | −0.2 | 48.7 | 100.5 |
| Comp. Ex. 8 | 40.0 | 50.0 | 130 | 155 | 3483 | 2.1 | 34.1 | 94.2 |

| | Microwave drying step | | | | Water content of first dried honeycomb formed body after microwave drying (%) | Water removal ratio after microwave drying (%) |
|---|---|---|---|---|---|---|
| | Frequency (MHz) | Output (kW) | Time (sec.) | Temperature at center part (° C.) | | |
| Comp. Ex. 1 | 915 | 75 | 280 | 68 | 2.5 | 94.8 |
| Comp. Ex. 2 | 915 | 75 | 280 | 62 | 2.7 | 94.4 |
| Comp. Ex. 3 | 915 | 60 | 280 | 80 | 2.2 | 95.5 |
| Comp. Ex. 4 | 915 | 60 | 280 | 82 | 2.4 | 95.1 |
| Comp. Ex. 5 | 915 | 60 | 220 | 106 | 4.2 | 88.2 |

TABLE 2-continued

| | | | | | | |
|---|---|---|---|---|---|---|
| Ex. 1 | 915 | 63 | 220 | 91 | 2.9 | 91.9 |
| Ex. 2 | 915 | 63 | 220 | 98 | 2.2 | 93.8 |
| Ex. 3 | 915 | 60 | 220 | 101 | 2.3 | 93.6 |
| Ex. 4 | 915 | 45 | 220 | 109 | 2.1 | 94.1 |
| Ex. 5 | 915 | 40 | 220 | 112 | 3.0 | 91.6 |
| Ex. 6 | 915 | 40 | 220 | 110 | 2.6 | 92.7 |
| Ex. 7 | 915 | 23 | 280 | 122 | 1.4 | 97.1 |
| Ex. 8 | 915 | 20 | 280 | 121 | 1.8 | 96.3 |
| Ex. 9 | 915 | 13 | 220 | 136 | 2.3 | 93.6 |
| Ex. 10 | 915 | 15 | 130 | 126 | 1.1 | 97.0 |
| Comp. Ex. 6 | — | — | — | — | — | — |
| Comp. Ex. 7 | — | — | — | — | — | — |
| Comp. Ex. 8 | — | — | — | — | — | — |

TABLE 3

| | Evaluation at drying step | Evaluation after firing | Comprehensive evaluation |
|---|---|---|---|
| Comp. Ex. 1 | NG | NG | NG |
| Comp. Ex. 2 | NG | NG | NG |
| Comp. Ex. 3 | NG | NG | NG |
| Comp. Ex. 4 | NG | NG | NG |
| Comp. Ex. 5 | OK | NG | NG |
| Ex. 1 | OK | OK | OK |
| Ex. 2 | OK | OK | OK |
| Ex. 3 | OK | OK | OK |
| Ex. 4 | OK | OK | OK |
| Ex. 5 | OK | OK | OK |
| Ex. 6 | OK | OK | OK |
| Ex. 7 | OK | OK | OK |
| Ex. 8 | OK | OK | OK |
| Ex. 9 | OK | OK | OK |
| Ex. 10 | OK | OK | OK |
| Comp. Ex. 6 | NG | — | NG |
| Comp. Ex. 7 | NG | — | NG |
| Comp. Ex. 8 | NG | — | NG |

In Table 1, "volume (L)" is a value calculated in accordance with the expression: $((\text{Diameter (mm)}/10)/2)^2 \times (\text{pi}) \times (\text{Length (mm)}/10)/1000$. In Table 2, the removal ratio after induction (%) is a value calculated in accordance with the expression: $\{1-(\text{Mass after induction}/\text{Mass before drying})\} \times 100$. The drying ratio (%) is a value calculated in accordance with the expression: (Removal ratio after induction)/(Initial water content)×100. Note here that this "drying ratio" indicates the amount of water removed from the entire water amount that the non-fired honeycomb formed body contained before drying. It is necessary for the present invention that this drying ratio is 20 to 80%.

Examples 2 to 10, Comparative Examples 1 to 8

Honeycomb structures were manufactured similarly to Example 1 except that the conditions were changed as in Table 1 and Table 2. Table 3 shows the evaluation result of the honeycomb dried bodies and the honeycomb structures in this method. In Comparative Examples 6 to 8, the temperature at the center of the non-fired honeycomb formed bodies exceeded 150° C. during the induction drying step, and so these first dried honeycomb formed bodies had the risk of deformation. Therefore, they were not microwave-dried.

Table 1 to Table 3 show that the method for manufacturing a honeycomb structure in Examples 1 to 10 generated less cracks and deformation of the cells during drying of a honeycomb formed body with large volume as compared with the method for manufacturing a honeycomb structure in Comparative Examples 1 to 8 and produced a honeycomb structure effectively.

A method for manufacturing a honeycomb structure of the present invention can be used to manufacture a honeycomb structure available as a filter to purify exhaust gas from automobiles or the like.

DESCRIPTION OF REFERENCE NUMERALS

1: Non-fired honeycomb formed body, 10: Induction drying device, 11: Conveyor, 12: Perforated plate, 15, 16: Electrode plates, 20: Microwave drying device

What is claimed is:

1. A method for manufacturing a honeycomb structure, comprising:
a step of manufacturing a honeycomb formed body to manufacture a non-fired honeycomb formed body having volume of 7 L or more and including a cell wall that defines a plurality of cells extending from a first end face as one end face to a second end face as the other end face, the non-fired honeycomb formed body including a raw material composition containing a ceramic raw material and water;
a drying step of drying the manufactured non-fired honeycomb formed body to obtain a honeycomb dried body; and
a firing step of firing the obtained honeycomb dried body to obtain a honeycomb structure, wherein
the drying step includes:
a first drying step comprising an induction drying step of induction-drying the non-fired honeycomb formed body so as to obtain a first dried honeycomb formed body by removing 20 to 80% of the entire water that the non-fired honeycomb formed body contained before drying, and
a second drying step comprising a microwave drying step of microwave-drying the first dried honeycomb formed body subjected to the induction drying step so as to obtain a honeycomb dried body by removing the residual water,
wherein the honeycomb dried body subjected to the microwave drying step is obtained by removing 90% or more of the entire water that the non-fired honeycomb formed body contained before drying,
wherein the percentage of water removed after induction-drying is determined by the expression: (1−(water content after induction-drying/entire water content before drying))×100,
wherein the percentage of water removed after microwave-drying is determined by the expression: (1−(water content after microwave-drying/entire water content before drying))×100, and
wherein the first drying step excludes microwave-drying and the second drying step excludes induction-drying.

2. The method for manufacturing a honeycomb structure according to claim 1, wherein the non-fired honeycomb formed body to be supplied to the induction drying step in the drying step has water content before drying of 20 to 60%.

3. The method for manufacturing a honeycomb structure according to claim 1, wherein the raw material composition includes water absorbable resin as pore former.

4. The method for manufacturing a honeycomb structure according to claim 1, wherein the non-fired honeycomb formed body to be supplied to the induction drying step in the drying step has a round pillar shape, the non-fired honeycomb formed body has a diameter of an end face of 220 to 400 mm, and has a length in the cell-extending direction of 200 to 400 mm, and the non-fired honeycomb formed body has a thickness of the cell wall of 30 to 350 μm.

\* \* \* \* \*